United States Patent [19]

Martin

[11] 4,096,698
[45] Jun. 27, 1978

[54] SOLAR ENERGY CONVERTING DEVICE

[76] Inventor: Charles S. Martin, 207 Hamilton Ave., Albemarle, N.C. 28001

[21] Appl. No.: 759,581

[22] Filed: Jan. 14, 1977

[51] Int. Cl.² .............................................. F03G 7/02
[52] U.S. Cl. ...................................... 60/641; 60/650; 60/682
[58] Field of Search ................ 60/650, 682, 641, 659, 60/652

[56] References Cited

U.S. PATENT DOCUMENTS

| 1,274,478 | 8/1918 | Webb | 60/682 |
|---|---|---|---|
| 3,048,006 | 8/1962 | Goodman | 60/641 |
| 3,436,908 | 4/1969 | Van Delic | 60/641 |
| 3,894,393 | 7/1975 | Carlson | 60/641 |
| 4,033,126 | 7/1977 | Newland | 60/641 X |

Primary Examiner—Allen M. Ostrager
Attorney, Agent, or Firm—Mills & Coats

[57] ABSTRACT

In abstract a preferred embodiment of the present invention is an energy converting device adapted to be utilized for the generation of electricity. The energy converting device of the present invention comprises a solar heat collecting main structure positioned generally over a subterranean well. Air which has been channeled to the base of said well is initially heated and caused to rise. Additional thermal energy is added to said air by solar energy collected by said main structure. Disposed about an uppermost end of said solar collecting main structure is a windmill assembly which is rotatively driven by rising channeled air passing through the solar collecting main structure. An electrical generator is operatively connected to the windmill assembly and driven thereby such that electricity is generated as the windmill assembly is driven.

7 Claims, 3 Drawing Figures

SOLAR ENERGY CONVERTING DEVICE

The present invention relates to solar energy and more particularly to a solar energy converting device which may be adapted to be utilized in the generation of electricity.

BACKGROUND OF THE INVENTION

The fossil fuel resources of the earth are being depleted at an ever increasing rate. Unless some type of alternative energy source is found, man likely will one day find himself without the means to drive his many machines Nuclear energy has long been considered man's ultimate energy resource and great effort has been made to harness the vast energy potential of the atom. However, scientists now realize that the earth's atomic fuel supply is not as abundant as first thought. In addition, an aware public is beginning to realize and understand the complexity involved in establishing fail safe controls for even the simplest nuclear generating plant. It is, therefore, the current trend to deemphasize the spread of atomic power use.

The need for an abundant energy resource that is readily available to most of the inhabited world is quite evident. Not only should the energy source be virtually inexhaustable but it should also be a clean fuel. That is, there should be few if any harmful by-products from its use which would pollute the earth's environment.

In view of the aforementioned items, it can be appreciated why solar energy is being advanced to the forefront as being the solution to man's energy problem. Not only is solar energy a clean fuel but more importantly it is a limitless quantity.

Even though solar energy's potential is now appreciated there remains a problem which pertains to its feasible conversion into a usable and reliable power supply. This problem has no simple solution and may require many more years of research before the sun's energy is reasonably utilized.

In the past little has been done to utilize solar energy in the generation of electricity. Both the availability of more economical power sources and a lack of solar technology are most likely the reasons. A device is needed today that can convert solar energy into an economical and usable energy source.

SUMMARY OF THE INVENTION

The present invention presents a solar energy converting device which is simple in construction, reliable in operation and adaptable to supply power to both large and small users. In particular the solar energy converting device of the present invention is adapted to convert solar energy into a power source which can drive an electrical generator. Basically this is accomplished by channeling and directing heated air from a lower level to an upper electrical level of an air channeling device where the vertically moving air acts to drive a windmill assembly which in turn powers a generator. Efficiency is emphasized by the present invention by heating the air with collected solar energy, and even some of the solar energy collected may be stored for use during nighttime or other desired periods such as during cloudy intervals or in situations where energy demands are high.

It is, therefore, an object of the present invention to provide a device that readily and efficiently converts solar energy into a useful and dependable form of energy.

More particularly it is an object of the present invention to provide a solar energy converting device which creates a vertically rising column of heated and accelerating air and channels said rising air such that it crosses the vanes of a windmill type system and rotationally drives the same which in turn generates electricity by powering a generator which is operatively connected thereto.

Another object of the present invention is to provide an energy generating system that basically utilizes available solar energy to produce energy in a readily usable form and wherein the present invention is provided with means for collecting and storing solar energy in such a manner that the stored energy may be utilized during selected periods of operation.

A further object of the present invention is to provide a solar energy converting device that utilizes available solar energy to produce energy in a readily usable form wherein the energy convertion device is simple in construction, reliable in operation, and efficient in production.

In addition, a further object of the present invention is to provide a solar energy converting device that is economically practical to both large and small users.

Other objects and advantages of the present invention will become apparent from a study of the following description and the accompanying drawings which are merely illustrative of the present invention.

DESCRIPTION OF THE PREFERRED EMBODIMENT

Figure 1:
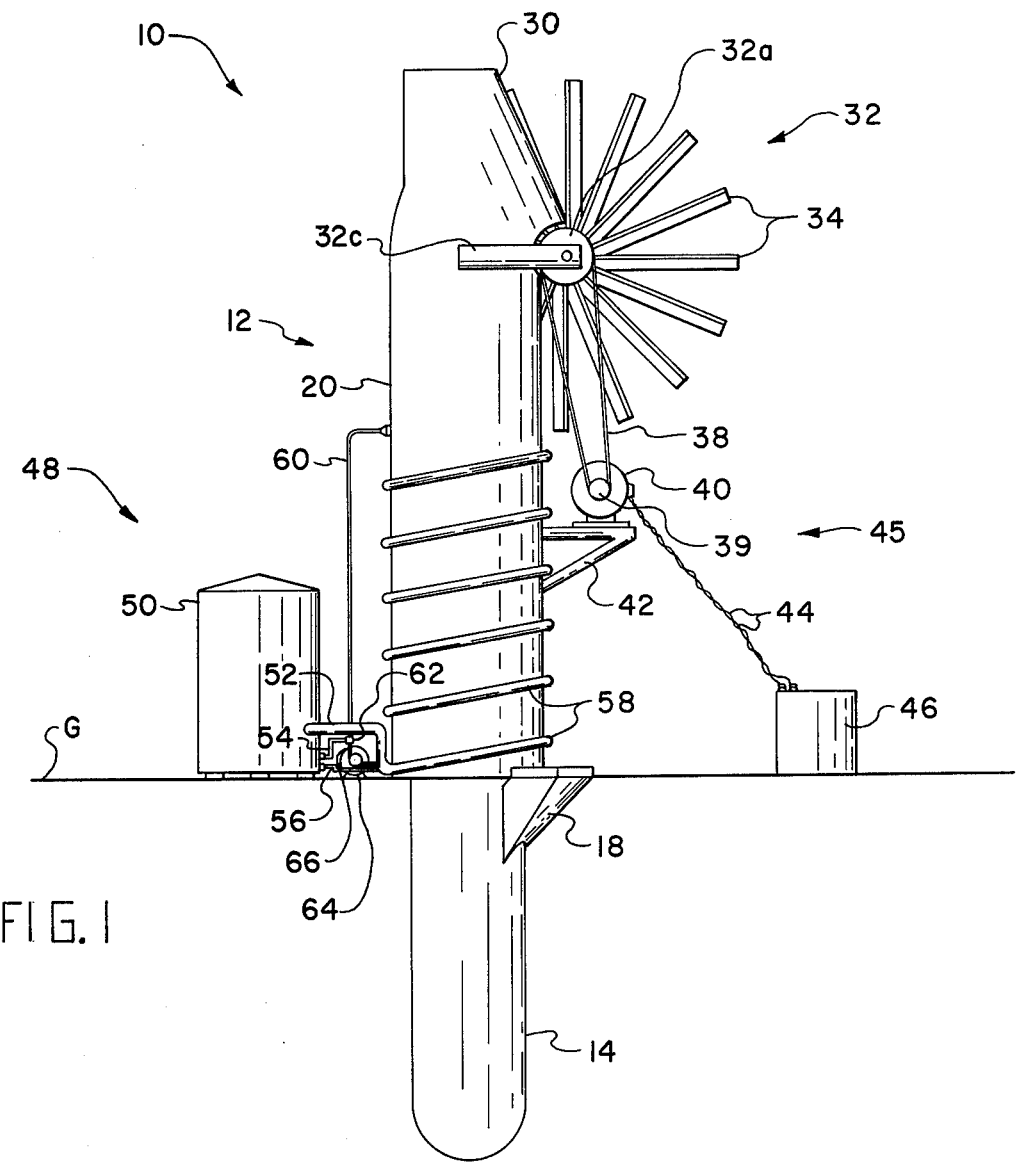
FIG. 1 is a side elevational view of the solar energy converting device of the present invention.
Figure 2:
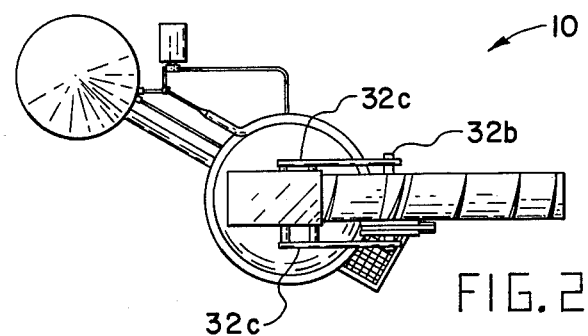
FIG. 2 is a plan view of the solar energy converting device shown in FIG. 1.

With further reference to the drawings, particularly FIGS. 1 and 2, the solar energy converting device is shown therein and indicated generally by the numeral 10. Viewed broadly, the solar energy converting device 10 comprises a generally upright air channeling device 12 for channeling air generally vertically from a lower level to an upper elevated level, a solar energy storage system 48 that acts to collect and store solar energy, a turbine assembly 32 rotatively mounted about an upper portion of said air channeling device 12 and rotatively responsive to air moving through the air channeling device, and an electrical generation system 45 operatively connected to said turbine assembly 32 for converting mechanical energy associated with said driven assembly 32 into electrical energy.

First, viewing the air channeling device 12 in detail, it is seen that the same comprises an upright aboveground section 20 that is generally disposed above a subterranean section 14 that is disposed in a cavity formed within the ground G, as illustrated in FIG. 1. Sections 20 and 14 of the air channeling device 12, as seen in FIG. 3, are opened and aligned such that air may readily move from the lower level of section 14 into and through an internal open area 28 in the aboveground section 20.

Subterranean section 14 is divided into first and second subsections 22 and 16, respectively, by a vertically oriented wall 26. Subsection 22, as illustrated in FIG. 3, extends from approximately ground level downwardly where the lower portion thereof is communicatively opened to second subsection 16 that extends vertically therefrom upwardly to approximately ground level where the same is opened to the aboveground section 20 of the air channeling device 12. It is seen that subsections 16 and 22 are of a generally integral construction including an outer wall structure that is generally arcuately shaped about the lower end portion and spaced vertically from the lower terminal end of the divider wall 26 in order that air may readily move from the internal open area of the first subsection 22 into the open area of the second subsection 16.

Figure 3:
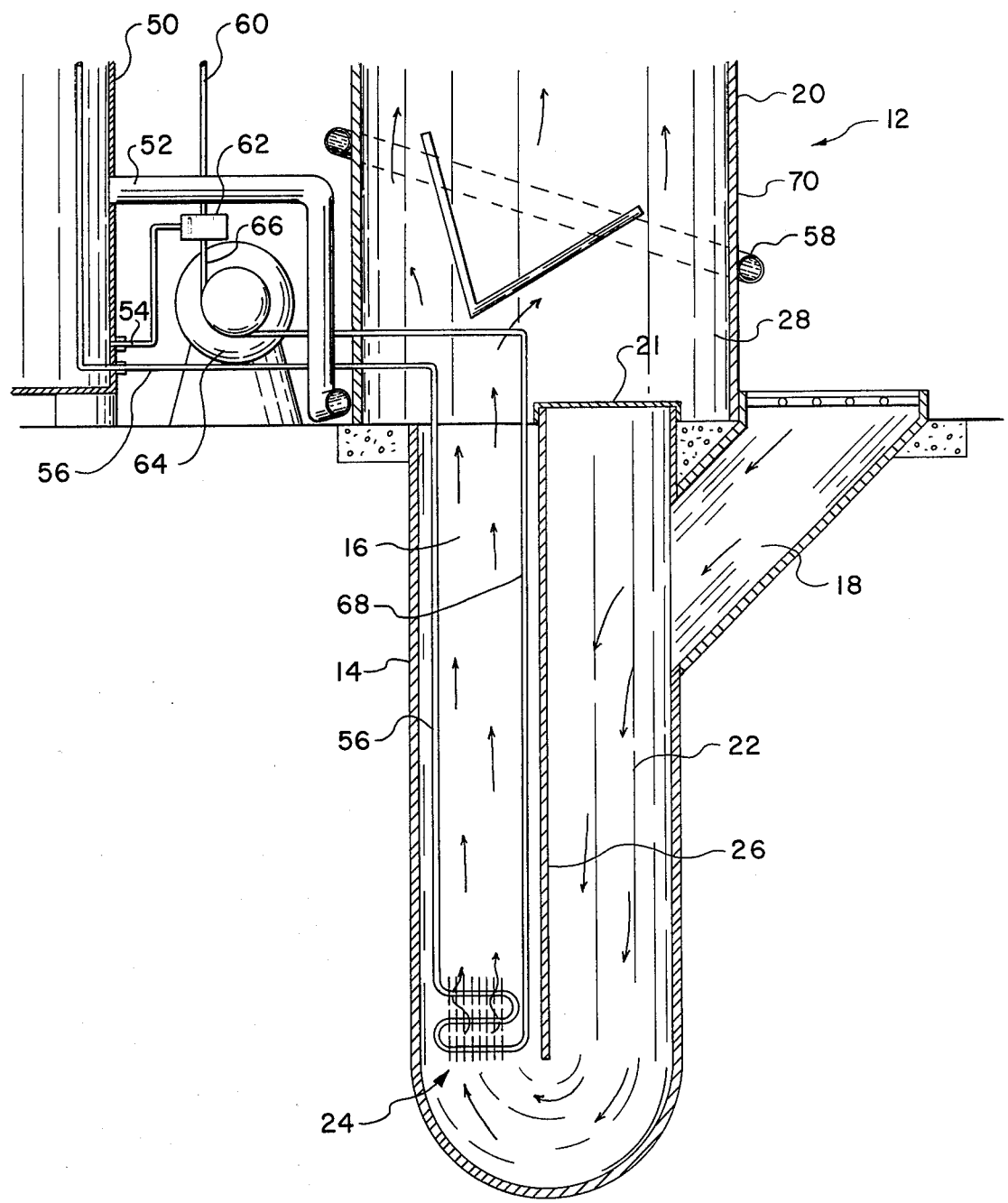
FIG. 3 is an enlarged fragmentary view of a lower section of the solar converting device of the present invention.

Outside ambient air may be introduced into the first subsection 22 by an air intake port 18 that extends generally diagonally from the outer wall structure of the first subsection 22, as viewed in FIG. 3. Air intake port 18 includes an upper end that may be opened to the atmosphere such that air entering the same may move downwardly through the air intake port 18 into the first subsection 22.

Continuing to refer to the air channeling device 12, as noted hereinbefore an aboveground section 20 extends generally upwardly above the subterranean section 14. Viewing the aboveground section 20, it is seen that the same is of a generally upright cylindrical construction and includes an internal open area 28 therein that is communicatively connected to the second subsection 16 of the subterranean section 14 in order that air moving vertically through subsection 16 may readily move into the opening area 28 of the aboveground section 20. It should be noted that the first subsection 22 includes an enclosure top 21 about the top portion thereof that effectively assures that air entering the air intake port 18 will be constrained to move downwardly through the first subsection 22 and will not avoid circulation through the second subsection 16.

Disposed about the upper portion of the aboveground section 20 of the air channeling device 12 is a shroud structure 30. The shroud structure 30 is designed to converge the upwardly moving air passing through the internal open area 28 such that the entire volume of air moving through the aboveground section 20 is constrained to exit through the shroud structure. As seen in the drawings, the cross sectional area of the shroud 30 in the preferred embodiment is less than the cross sectional area of the aboveground section 20 and as particularly illustrated it is seen that the cross sectional area of the shroud is generally rectangularly shaped and includes an upper air exiting opening 31.

Rotatively mounted about an upper portion of the air channeling device 12 is a windmill assembly 32 that includes a plurality of radially extending vanes 34. The windmill assembly 32 is rotatively mounted such that one or more of the radially extending vanes 34 thereof extends into the normal path of exiting air moving vertically through the air channeling device 12. More particularly, the windmill assembly 32 is disposed such that a plurality of the extending vanes 34 protrude into the internal air passing area defined by the shroud structure 30 and wherein the individual vanes are designed so as to occupy a substantial cross sectional area that is preferably just less that the horizontal cross sectional area of the shroud structure 30, as viewed in FIG. 1. The presence of the plurality of vanes 34 extending into the area defined by the shroud structure 30 assures that vertically moving air passing through the air channeling device 12 and exiting through the shroud structure 30 will continuously engage the vanes 34 of the windmill assembly 32, and consequently the windmill assembly will be driven by this vertically moving air.

Viewing the windmill assembly 32 in more structural detail, it is seen that the same includes a rotor shaft 32b rotatively supported within a pair of support arms 32c fixed to the shroud structure 30 and extending therefrom. A pulley 32a is secured to the rotor shaft 32b and rotatable therewith as said windmill 32 is rotatively driven by vertically moving air currents passing through and exiting from the shroud structure 30. Drivingly engaged with pulley 32a is a belt 38 that is drivingly connected to an input pulley and shaft 39 of an electrical generator 40 which in the preferred embodiment shown in FIG. 1 is supported about the air channeling device 12 by a frame support 42.

Electricity generated by the generator 40 is transferred to a transmission device 46 via conducting line 44. Therefore, it is appreciated that as the windmill assembly 32 is rotatively driven by vertically moving air currents, the mechanical energy generated thereby is transferred to the generator 40 which in turn generates electricity that is routed to the conventional transmission device 46 where the generated electricity can be routed so that the electricity can be appropriately utilized.

In order to further induce the air entering the air channeling device 12 to move upwardly, an air preheating means indicated generally by the numeral 24 is provided about the lower portion of the subterranean section 14. In the case of the embodiment illustrated in FIG. 3, the preheating means is particularly provided about the lower portion of the second subsection 16 so as to generally heat air entering the lower portion of subsection 16 from subsection 22. The preheating means 24 may be any conventional heating means such as a direct fired fuel burner, an electric heater, or a hot water heating system. The heating of the air about the lower portion of the subterranean section 14 will generally induce the air to move more efficiently and faster from the lower portion of the air channeling device 12 to the upper portion thereof.

The aboveground section 20 includes an outer exposed surface 70 that is preferably thermally black and acts as a solar heat collecting surface. Available solar radiation is collected about the thermally black collecting surface 70 and the energy associated therewith or a portion thereof may be transferred directly inwardly to the interior of the aboveground section 20 such that the energy collected in the form of heat may be transferred by convection to the upwardly moving air passing through the open area 28 defined therein. This additional heat collected by solar radiation acts to further heat the upwardly moving air and to further induce the air upwardly through the aboveground section 20.

With further reference to FIG. 3, a solar energy storage system is shown therein in association with the solar energy converting device 10 of the present invention and is indicated generally by the numeral 48. This energy storage system includes a storage tank 50 disposed adjacent the aboveground section 20 and adapted to contain a fluid solution such as water therein.

Connected to the storage tank 50 is a routing line 52 that leads to a spirally wound fluid heating line 58 that is wound around the outer surface 70 of the aboveground section 20. The spirally wound fluid heating line 58 is disposed clearly adjacent the thermally black outer wall 70. About the upper extremity of the spiral wounding, there is provided a return line 60 communicatively connected to the spirally wound line 58 for returning fluid through a normally open control valve 62 and through a pump 66.

The valve 62 is normally open during the daytime such that returning fluid passing through the return line 60 passes on through the pump 66 and therefrom through routing line 68 to the preheater means 24 disposed in the lower portion of the subterranean section 14. In the case of the embodiment illustrated in FIG. 3, the preheater means 24 is of the hot water or fluid coil type and acts to heat incoming air passing the preheater means. From the preheater means 24 fluid or water is pumped by the pump 66 through line 56 which returns the fluid to the storage tank 50.

At nighttime or times where there is little or no available solar radiation, any heat energy stored within the storage tank 50 may be utilized by directly pumping the fluid through the preheater means 24 without routing the fluid or water through the spirally wound heater line 58. In this case, the valve 62 is turned to the off position, and fluid flow from the tank 50 passes through line 54, through valve 62, through pump 66, and into line 68 where the fluid is delivered to the preheater means 24. From the preheater means 24 the fluid flow moves through line 56 and back into tank 50. Consequently it is seen that the solar energy storage system 48 is adapted to collect available solar energy, in the form of heat, and to utilize at least a portion of that heat during certain periods of operation to heat air moving vertically pass the preheater means 24. In addition, in situations where the preheater means 24 does not utilize all of the energy collected, the excess energy not used can be stored in the storage tank 50 and used at night or times where the quantity of available solar radiation is limited.

In the basic operation of the solar energy converting device 10 of the present invention, air is allowed to enter the open area of the air intake port 18 where the air is directed into the first subsection 22 of the subterranean section 14. Once in the subsection 22, the air tends to move downwardly to the lower portion of the subterranean section 14 where the air is generally turned upwardly into the second subsection 16. Once entering the second subsection 16, air passes the preheater means 24 and heat is transferred therefrom to the passing air, generally inducing the air to move upwardly through the first subsection 16 and into the open area 28 of the aboveground section 20.

Air moving through the aboveground section 20 is also heated by the solar energy collected about the thermally black outer surface 70 as this heat is transferred inwardly to the passing air. This additional heating generally results in the air being further induced to move upwardly through the aboveground section 20.

As the vertically moving air exists through the shroud structure 30, the air engages respective vanes 34 of the windmill assembly 32 causing the same to be rotatively driven. The mechanical energy associated with the rotatively driven windmill assembly is used to drive the generator 40 which in turn generates electricity that may be appropriately utilized.

It should be pointed out that the mechanical energy associated with the windmill assembly may be used to generate energy in other forms. For example, it is conceivable that the windmill assembly could be operatively connected to a pump in which the case the mechanical energy associated with the rotatively driven windmill assembly 32 would drive the pump.

From the foregoing specification, it is seen that the present solar energy converting device is relatively simple in construction and is adapted to generate energy or to convert readily available energy to a convenient usable form that can be used by individuals or small communities.

The terms "upper", "lower", "forward", "rearward", etc., have been used herein merely for the convenience of the foregoing specification and in the appended claims to describe the solar energy converter and its parts as oriented in the drawings. It is to be understood, however, that these terms are in no way limiting to the invention since the solar energy converter may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A solar energy converting device comprising: an upright air channeling device having an elongated generally closed internal air channeling area for channeling air from a lower level to an upper elevated level; means provided about a lower level of said air channeling device for permitting air to enter the lower level thereof; preheating means disposed about the lower level of said air channeling device for heating air entering the lower level thereof which tends to cause the preheated air to more readily move upwardly within the air channeling device; said air channeling device having a main exposed outer solar energy collecting surface for collecting available solar energy and transferring a portion of any collected solar energy inwardly to the air moving vertically therein so as to provide additional heat to the vertically moving air; windmill means having a plurality of radially extending vanes rotatively mounted about an upper level of said air channeling device and disposed such that a portion thereof lies in the normal air flow path of air moving vertically from the lower level of said air channeling device to an upper level of said air channeling device such that said windmill means is rotatively driven in response to rising air moving within said air channeling device engaging vanes of said windmill means, thereby causing the vanes of said windmill means to be rotatively driven; energy conversion means operatively connected to said windmill means and driven thereby for converting energy of said rotatively driven windmill means to a desired form of useful energy; and means for collecting solar energy and storing at least a portion thereof during periods where solar energy is available for use during desired periods such as nighttime or during periods of limited sunlight for preheating said air entering said air channeling device.

2. The solar energy converting device of claim 1 wherein said means for collecting solar energy and storing at least a portion thereof includes a fluid heating system having a fluid storage tank; a fluid routing line operatively connected to said fluid storage tank and disposed adjacent portions of said main exposed outer solar energy collecting surface of said air channeling device; and pump means for pumping fluid from said storage tank through said routing lines such that as the fluid is pumped through said routing line the energy associated with solar energy collected about said air channeling device may be transferred to the fluid passing through said routing line.

3. The solar energy converting device of claim 2 wherein said fluid heating system forms at least a part of said preheating means as said fluid heating system includes a fluid type preheating means for selectively routing heated fluid from said fluid heating system to a lower level of said air channeling device.

4. The solar energy converting device of claim 3 wherein said routing line of said fluid heating system is spirally wound around said air channeling device at a level above ground level and wherein said routing line is disposed directly adjacent said exteriorly exposed solar energy collecting surface of said air channeling device such that the fluid may be heated as it passes through said routing line.

5. The solar energy converting device of claim 1 wherein said air channeling device includes an aboveground section that extends vertically from ground level to an upper elevated height, and wherein said air channeling device further includes a subterranean section formed within the earth generally underneath said aboveground section and communicatively connected to said aboveground section such that air entering said air channeling device at the subterranean level may move vertically therethrough, into and through said aboveground section.

6. The solar energy converting device of claim 5 wherein said subterranean section includes a first subsection extending generally from ground level to a general bottom portion of said subterranean section, and a second subsection that extends from said bottom area upwardly through the ground to where the same joins said aboveground section of said air channeling device; and wherein said means for allowing air to enter said air channeling device includes opening means provided in said first subsection of said subterranean section for allowing air to enter about the upper portion thereof.

7. The solar energy converting device of claim 6 wherein said first and second subsections of said subterranean section form a generally U-shaped subterranean section; and wherein said preheating means is disposed just above the bottom of said subterranean section about the lower level of said second subsection of said subterranean section.

* * * * *